United States Patent
Chhabra et al.

(10) Patent No.: US 11,036,906 B1
(45) Date of Patent: Jun. 15, 2021

(54) METHOD AND APPARATUS TO ACCELERATE VERIFICATION SIGNOFF BY SELECTIVE RE-USE OF INTEGRATED COVERAGE MODELS

(71) Applicant: Cadence Design Systems, Inc., San Jose, CA (US)

(72) Inventors: Praveen Kumar Chhabra, Noida (IN); Devraj Goyal, Greater Noida (IN); Amit Kumar Tiwari, Fremont, CA (US); Manisha Singla, Greater Noida West (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/751,623

(22) Filed: Jan. 24, 2020

(51) Int. Cl.
*G06F 30/3308* (2020.01)
*G06F 30/398* (2020.01)

(52) U.S. Cl.
CPC ........ *G06F 30/3308* (2020.01); *G06F 30/398* (2020.01)

(58) Field of Classification Search
USPC ......................................................... 716/106
See application file for complete search history.

(56) References Cited

U.S. PATENT DOCUMENTS

| | | |
|---|---|---|
| 10,031,991 B1 | 7/2018 | Chhabra et al. |
| 2009/0037858 A1* | 2/2009 | Thakur ............ G01R 31/31835 716/106 |
| 2009/0037859 A1* | 2/2009 | Thakur .................... G06F 30/33 716/106 |
| 2010/0070935 A1* | 3/2010 | Bist .......................... G06F 30/33 716/136 |
| 2010/0070940 A1* | 3/2010 | Bist .......................... G06F 30/33 716/106 |
| 2015/0213174 A1* | 7/2015 | Meyer ..................... G06F 30/33 703/16 |

* cited by examiner

*Primary Examiner* — Mohammed Alam
(74) *Attorney, Agent, or Firm* — Tarolli, Sundheim, Covell & Tummino LLP

(57) ABSTRACT

In the context of electronic design automation and in particular coverage-driven verification, each of a number of integrated coverage models to be merged for coverage analysis are divided between a code coverage model and a functional coverage model. During a coverage model generation phase, new code coverage models or functional coverage models are created only if they are not already in a coverage model database repository; otherwise, they are copied. During a merging phase, code coverage models or functional coverage models are loaded only if they have not already been loaded. Signatures that can be based on checksums can be used to determine whether the models are unique or duplicates of those already created or loaded. Selectivity in the creation and re-use of the respective coverage models provides computational time savings in each of the creation and loading phases.

20 Claims, 5 Drawing Sheets

METHOD AND APPARATUS TO ACCELERATE VERIFICATION SIGNOFF BY SELECTIVE RE-USE OF INTEGRATED COVERAGE MODELS

TECHNICAL FIELD

The present invention relates generally to electronic design automation (EDA) tools and techniques, and specifically to a method and apparatus to accelerate verification signoff by selective re-use of integrated coverage models.

BACKGROUND

Electronic design automation (EDA) uses software tools for design and analysis of complex digital electronic systems such as printed circuit boards (PCBs) and integrated circuits (ICs). So as to ensure correct operability of a complicated digital electronic circuit design before significant investment is committed in the physical fabrication of chips or boards that use the design, and thus to avoid substantial waste and retooling, prior to fabrication of the design, a design can be required to pass a series of verification tests collectively referred to as "signoff."

Pre-production verification is a part of the digital semiconductor development cycle devoted to determining that a digital circuit design behaves as intended and within design specifications. Often performed prior to layout and routing phases of the development cycle, register transfer level (RTL) simulation and verification of a digital semiconductor design ensures that the design is logically correct and without major timing errors. In doing verification for a digital circuit design, a simulation setup can consist of two parts, a design under test (DUT) and a testbench (TB). In the context of pre-production verification, a design under test is a software description of a hardware device intended to be fabricated, written using a specification language such as Specification and Description Language (SDL), for example, Verilog, VHDL, or SystemVerilog. By contrast, a testbench is a software description at least of inputs to be applied to the design under test during suites of simulation test runs. A testbench is generally also configured to capture outputs of the design under test to which it is connected. Simulated outputs can be compared to expected outputs to provide the desired verification.

Coverage is defined as the percentage of verification objectives that have been met during the verification of a design under test, over all simulation test runs of the design. Measurements of the amount of coverage provided by test suites run against a particular design under test aid in assessing verification completeness. Two major types of verification coverage are used as indices of sufficiency of logic simulation patterns. One of the two major types of verification coverage is functional coverage, which checks whether all or some portion of the functions of a design under test have been simulation-tested based on external specifications of the design under test. For example, a user (e.g., a verification engineer) may write cover groups, e.g., SystemVerilog covergroups, as part of a functional coverage model. This functional coverage model can be considered as being associated with a testbench, in that a modification to (or complete rewrite of) the testbench between simulation test runs will result in a different functional coverage model being generated following a subsequent test run.

The other of the two major types of verification coverage is code coverage, which is based on a source code describing a design under test. Such source code can be written, for example, in a hardware description language (HDL). Code coverage can include, for example, line coverage, toggle coverage, and finite-state-machine (FSM) coverage. Line coverage, also called block coverage, is aimed at executing all or a subset of lines in the source code. Toggle coverage is aimed at changing all or a subset of signal lines described in the source code (e.g., bit-toggling of a signal bus in a design under test). FSM coverage is aimed at covering all or a subset of states and state transitions by determining a FSM from the source code. Thus, code coverage pertains to the execution of the RTL flow. Because HDL code lines executed do not correlate directly to functionality exercised, both code coverage and functional coverage are of interest in design verification procedures. Whereas a functional coverage model can be considered as being associated with a testbench, a code coverage model can be considered as being associated with a design under test, in that a modification to the design under test between simulation test runs will result in a different code coverage model being generated following a subsequent test run.

SUMMARY

One example includes a method for selective re-use of serialized coverage models in electronic design automation. Using a computer processor, a database repository is populated with a plurality of coverage model databases with each database including a code coverage model associated with a design under test and a functional coverage model associated with a testbench. The populating includes, for each respective database of the plurality of databases, computing signatures for each code coverage model and functional coverage model in the respective database, creating a new code coverage model for storing in the repository based on determining that the code coverage model is not already in the repository, or copying an existing code coverage model in the repository based on determining from the code coverage model signature that the code coverage model is already in the repository; and creating a new functional coverage model for storing in the repository based on determining that a functional coverage model is not already in the repository, or copying the functional coverage model in the repository based on determining from the functional coverage model signature that an existing functional coverage model is already in the repository. Only unique code coverage models and only unique functional coverage models are selectively read (e.g., from disk to memory) from the plurality of databases. The selectively read code coverage models and functional coverage models are merged.

Another example includes a system for selective re-use of serialized coverage models in electronic design automation. The system includes one or more computer processors coupled to a non-transitory memory storing instructions configured to, when executed by the one or more computer processors, populate a database repository with a plurality of coverage model databases with each database including a code coverage model associated with a design under test and a functional coverage model associated with a testbench. This population includes, for each respective database of the plurality of databases, computing signatures for each code coverage model and functional coverage model in the respective database; creating a new code coverage model for storing in the repository based on determining that a code coverage model is not already in the repository, or copying the code coverage model in the repository based on determining that the code coverage model is already in the repository; and creating a new functional coverage model for storing in the repository based on determining that a functional coverage model is not already in the repository, or copying the functional coverage model in the repository based on determining that the functional coverage model is already in the repository. The instructions are further configured to selectively read only unique code coverage models and only unique functional coverage models from the plurality of databases. The instructions are further configured to then merge the selectively read code coverage models and functional coverage models.

Yet another example includes one or more computer-readable media configured to provide a computer as the system set forth above, or to execute in conjunction with a computer the method set forth above. Such an example can include one or more non-transitory computer-readable media storing instructions that, when executed by a processor, cause the processor to populate a database repository with a plurality of coverage model databases with each database including a code coverage model associated with a design under test and a functional coverage model associated with a testbench. This population includes, for each respective database of the plurality of databases, computing signatures for each code coverage model and functional coverage model in the respective database; creating a new code coverage model for storing in the repository based on determining that a code coverage model is not already in the repository, or copying the code coverage model in the repository based on determining from the code coverage model signature that the code coverage model is already in the repository; and creating a new functional coverage model for storing in the repository based on determining that a functional coverage model is not already in the repository, or copying the functional coverage model in the repository based on determining from the functional coverage model signature that the functional coverage model is already in the repository. The instructions are further configured to selectively read only unique code coverage models and only unique functional coverage models from the plurality of databases. The instructions are further configured to then merge the selectively read code coverage models and functional coverage models.

DETAILED DESCRIPTION

During the verification process, testbenches are typically more dynamic than designs under test. This is because, while a testbench may be rewritten many times during the verification process to improve testing or to provide more complete coverage, a design under test is typically only altered when a bug is found in the design. Practically speaking, then, the chances of functional coverage model changes as a result of a change to a testbench (e.g., changes to cover group configurations) are greater than the chances of code coverage model changes as a result of a change to a design under test. A verification test suite can involve many hundreds or thousands of simulated tests run in regression. Each test can create a unique coverage model, which can be stored, for example, as a unified coverage model (.ucm) file. It may be desirable to merge these coverage models prior to analysis of them to assess whether enough coverage has been completed to prompt signoff. Such merging may be a computation-time intensive process, and not necessarily because of the merging itself. By some measurements, more than eighty percent of union merging time is taken by opening (loading from hard disk to memory) of coverage models. Actual merging takes only about fifteen percent of total merging time.

A coverage model file, which can be serialized and encoded, for example, in a .ucm format, represents a complete hierarchy of a user-written design plus a testbench, including coverage items either inferred automatically by a coverage software tool (such as Cadence Xcelium), and whatever functional coverage model is written by the user. A coverage data file, encoded, for example, in a .ucd format, stores the sample values of the coverage items present in the coverage model that are triggered during a simulation. Both a coverage model file and a coverage data file store information about the design hierarchy. In comparison to a coverage model file, a coverage data file is a relatively lightweight file, because when any given simulation is run, it is not the case that the complete design—the complete model—is executed. Only a certain portion of the model is triggered (simulated). For example, it may be the case that in any particular simulation run, only twenty to thirty percent of a design is triggered (simulated). In contrast to approaches that may create separate coverage model files for code coverage and functional coverage, or that may create and store separate coverage models for code coverage and functional coverage within an archive file, the approach taken by the systems and methods of described herein stores separate code and functional coverages in a single unified coverage model. For example, character buffers storing individual code and functional coverages can be serialized as class members of the unified coverage model. This approach can save processing time for the in-memory model creation and the class hierarchy serialization of reused models.

Figure 1:
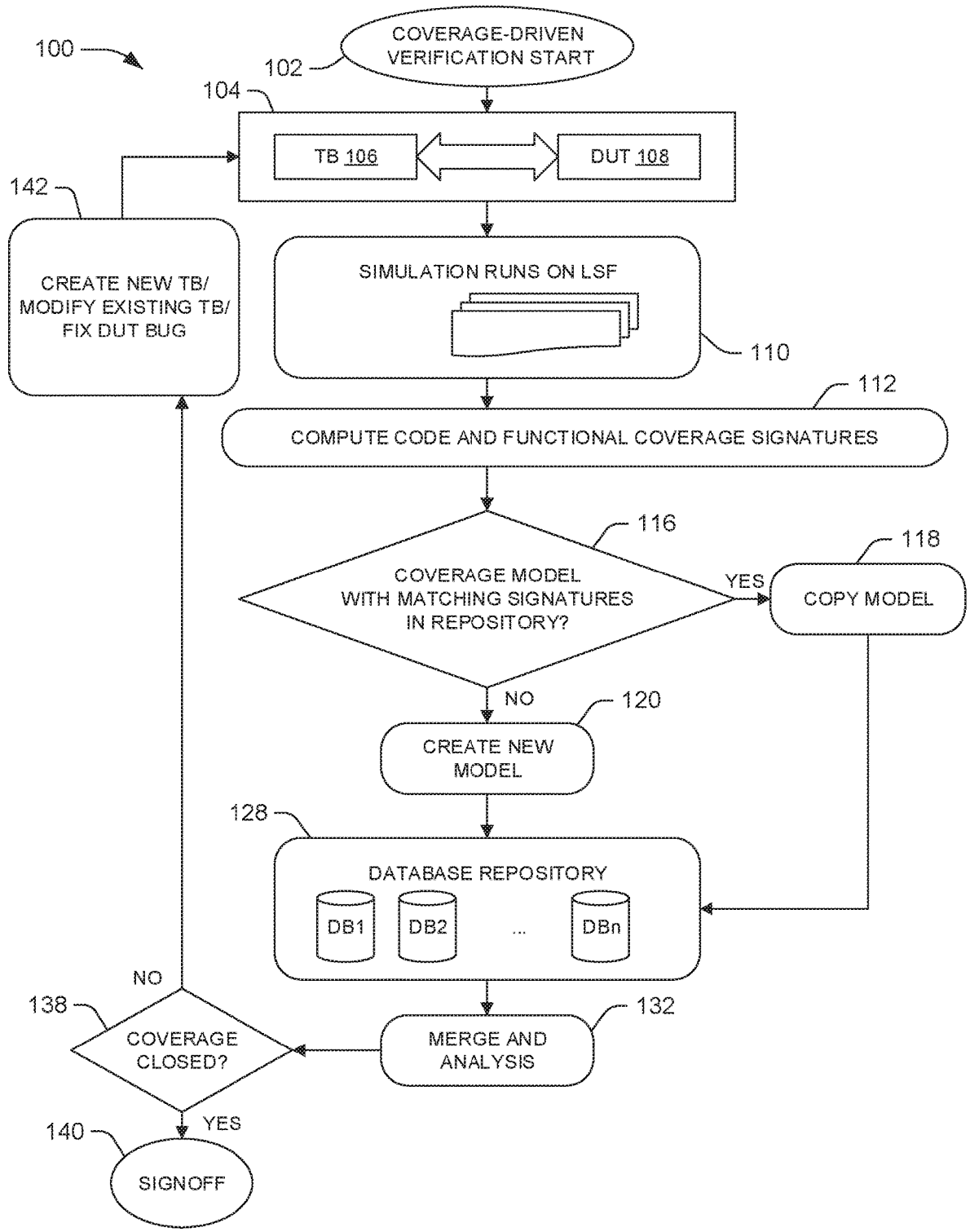
FIG. 1 is a flow diagram of an example method of coverage-driven verification closure that is not selective with regard to coverage model re-use.

FIG. 1 shows an approach 100 to coverage-driven verification closure that is not selective with regard to coverage model re-use. At the start 102, a verification simulation setup 104 includes a testbench 106 and a design under test 108. A number of simulation runs are performed 110 of the specified setup 104. Such simulation runs can, for example, be run on a load-sharing facility (LSF), a cluster of hosts used to execute batch jobs and managed by a workload management platform or job scheduler for distributed high-performance computing. Such simulation runs can, for example, be configured to be run overnight, or even over a period of several days or longer. Each simulation run generates coverage data and a coverage model. After completion of the simulation runs, code coverage signatures and functional coverage signatures can be computed 112. If, based on comparison of these signatures 112, for each test, it is determined that a coverage model with matching signatures is not already in database repository 128, then a new coverage model is created 120 and stored in the repository 128. If, however, a coverage model with matching signatures is determined to already be in the database repository 128, then said model is copied 118 in the repository 128. Following population of database repository 128 with all coverage model databases DB1, DB2, . . . DBn, in merge and analysis 132, the coverage models are merged with a union operation and coverage analysis is performed to determine whether the coverage is adequate and can be considered "closed" 138. If so, signoff is complete 140 (at least for the present stage of the design cycle) and the design cycle continues to the next stage; otherwise, one or more changes are made 142 to the simulation setup 104: a new testbench is created, or the existing testbench 106 is modified, and/or modifications are made to the design under test 108 to address one or more bugs in the design. As an example, coverage can be considered closed 128 based on comparing one or more coverages achieved to one or more coverage-goal threshold values.

Approach 100 has several disadvantages. For one thing, in approach 100, entire coverage models are newly created 120 even when portions of those coverage models are duplicates of portions of earlier-created coverage models. For example, a coverage model may share the same code coverage model with an earlier-created coverage model even if the functional coverage models of the two coverage models are different. For another thing, the merge process 132 can require a great deal of loading of duplicate information, as described in greater detail with respect to FIG. 4, which is inefficient and contributes considerably to the computation time of the approach 100.

Figure 2:
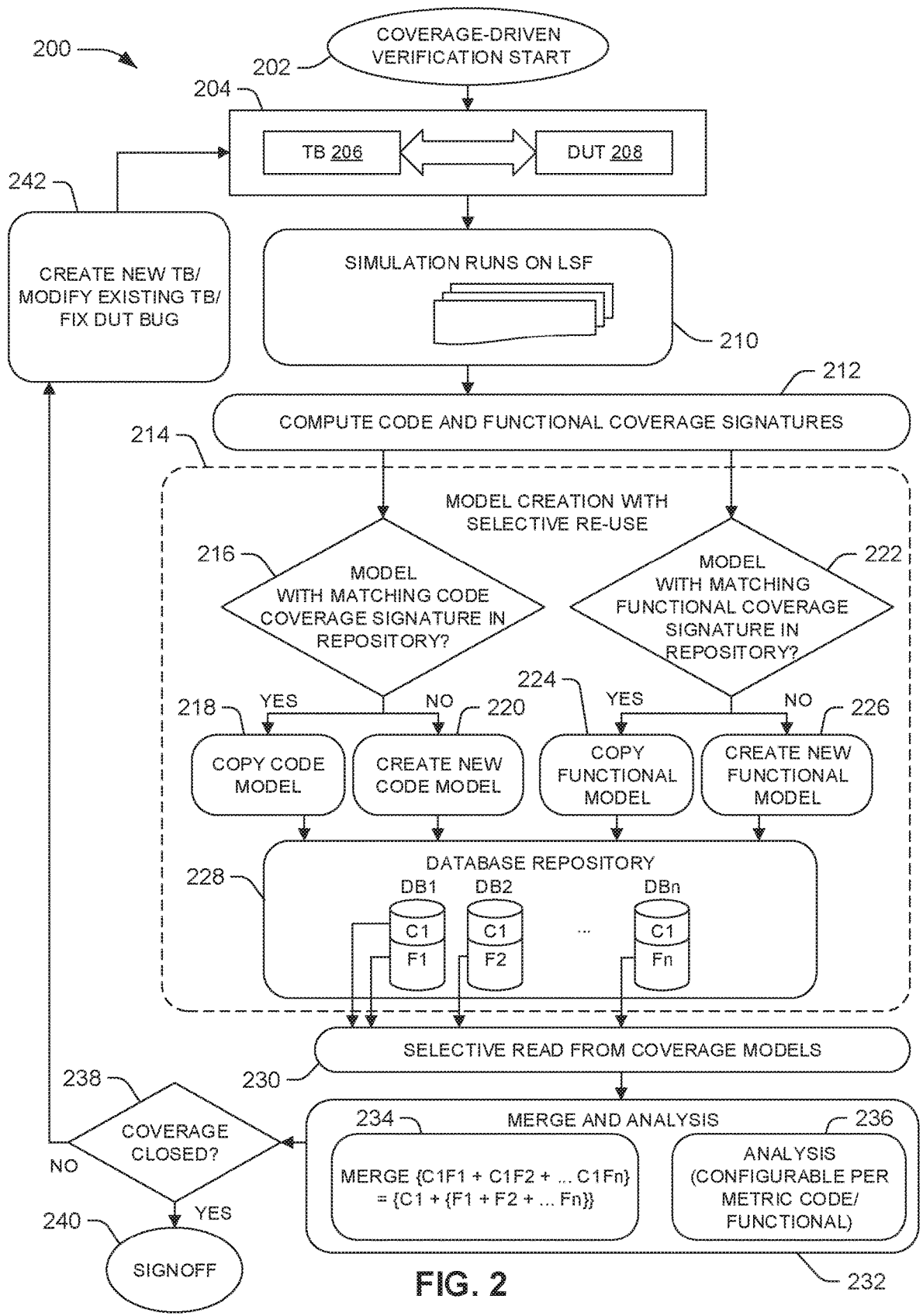
FIG. 2 is a flow diagram of an example method of coverage-driven verification closure with selective model re-use.

FIG. 2 shows an approach 200 to verification closure with selective coverage model re-use. At the start 202, a verification simulation setup 204 includes a testbench 206 and a design under test 208. As in approach 100, in approach 200, a number of simulation runs are performed 210 of the specified setup 204, and after completion of the simulation runs, code coverage signatures and functional coverage signatures can be computed 212. However, approach 200 includes model creation 214 with selective re-use of code coverage models or functional coverage models, whichever may be the case. In the illustrated example, because the testbench changes between tests but the DUT does not, the generated coverage model databases DB1, DB2, . . . DBn in the database repository 228 all have the same code coverage model, designated C1, but each has a different functional coverage model, designated F1, F2, . . . Fn.

In model creation with selective re-use 214, based on the computed signatures, for each test, it is determined 216 whether a model with a matching code coverage signature is already in database repository 228, and if not, then a new code coverage model is created 220 and stored in repository 228. If so, then then said code coverage model is copied 218 in the repository 228.

Similarly, in model creation with selective re-use 214, based on the computed signatures, for each test, it is determined 222 whether a model with a matching functional coverage signature is already in database repository 228, and if not, then a new functional coverage model is created 226 and stored in repository 228. If so, then then said functional coverage model is copied 224 in the repository 228.

In the illustrated example, coverage model database DB1 is created with sequence 216, 220, 222, 226, because for this first coverage model database, neither the code coverage model (C1) nor the functional coverage model (F1) is already in repository 228. For the creation of coverage model database DB2, however, the sequence is 216, 218, 222, 226 because code coverage model C1 is already in repository 228 (in coverage model database DB1) but functional coverage model F2 is not. This sequence is then repeated up through the creation of coverage model database DBn which copies the code coverage model C1 but creates new functional coverage model Fn.

In the selective read 230 of approach 200, only non-duplicate portions of the coverage model databases are read, rather than reading all portions of unique coverage model databases from repository 228, as is done in approach 100 with respect to coverage model databases in repository 128. Thus, in the illustrated example, based on the understanding from the earlier-computed signatures that code coverage model C1 is common to all coverage model databases in repository 228, code coverage model C1 is only read from disk to memory once, rather than being read n times, as it would be in approach 100.

Merge and analysis 232 includes a coverage model database merge 234 during which DB1=C1F1 is merged with DB2=C2F2, etc., to create the merged database represented by {C1+{F1+F2+ . . . Fn}}. This is followed by an analysis 236 to determine the extent of the coverage achieved. If, based on this analysis 236, it is determined 238 that coverage is adequate, then coverage can be considered "closed," and signoff is complete 240 (at least for the present stage of the design cycle). The design cycle then proceeds to the next stage. Otherwise, one or more changes are made 242 to the simulation setup 204: a new testbench is created, or the existing testbench 206 is modified, and/or modifications are made to the design under test 208 to address one or more bugs in the design.

Analysis phase 236 can take a number of forms. For example, a user (e.g., a verification engineer) may, during analysis phase 236, load one or more merged coverage model databases into an analysis tool (IMC) and, using the analysis tool, look for uncovered coverage items to consequently strategize ways to create new test cases to cover the uncovered coverage items or to modify testbench 206 or design under test 208 in a next set of automated simulation runs. In some examples, the task of analysis of the different coverage metrics is divided among multiple users (e.g., multiple verification engineers). Unlike with non-selective re-use verification process 100, in which a user might be required during analysis phase 132 to load an entire merged database irrespective of which particular coverage metric the user might be assigned to, in selective re-use verification process 200, a user is enabled to configure the analysis tool to selectively load either code coverage models, functional coverage models, or both coverage models while analyzing a merged coverage model database. This loading selectivity can present a particular advantage in modern verification scenarios, in which a coverage model database for a system-level design can contain hundreds of millions of coverage items, posing an overwhelming amount of information to analyze. By providing the ability to load code coverage metrics and functional coverage metrics separately, the systems and methods described herein enable users to focus on their respective specific tasks to perform closure on a particular coverage metric, whether code or functional.

Coverage model creation phase 214 and merge and analysis phase 232 are, in practice, ordinarily different steps in the verification process 200 that take place at different times of the process 200. For example, the creation phase 214 may occur during automated simulation scheduled to occur overnight or over a period of days to dump generated coverage model databases to repository 228, whereas merge and analysis phase 232 is commonly a post-processing phase performed using manual input(s) entered by one or more users (e.g., verification engineers) to analyze the coverage statistics earlier generated in the creation phase 214 and, based on resultant analysis 236, take required steps for a next set of simulations. Merging of coverage models is not in practice performed concurrently with the automated model creation phase 214 because, among other reasons, it may be the case that thousands of simulations are run in parallel on different machines in an LSF (compute cluster), meaning that it would be more computationally costly for each simulation to perform a merge step similar to what is done in one go in post processing.

Figure 3:
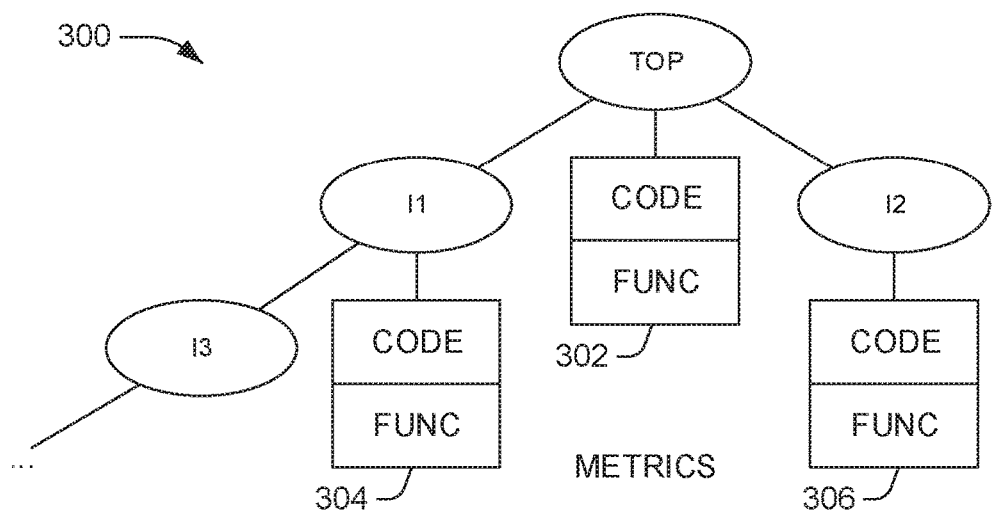
FIG. 3 is an example coverage model graph.

Generated coverage model databases DB1, DB2, . . . DBn can be stored as serialized versions of coverage model graphs representative of the design hierarchy. In the example coverage model graph 300 of FIG. 3, a top model TOP contains two instances I1, I2. I2 contains an instance I3, and I3 contains still further instances (not shown). These instances represent parts of a digital circuit design under test that may each be separately simulated and verified. For each instance there can be stored in a coverage model file some coverage model comprising a code coverage model ("CODE") and functional coverage model ("FUNC"). Thus, for example, TOP has coverage model 302, I1 has coverage model 304, I2 has coverage model 306, and so on. The same applies for all instances in graph 300. A code coverage model checksum can be generated to use as a signature, or as a basis for a signature, for each code coverage model, that is, for each code coverage model portion of a coverage model database file. Similarly, a functional coverage model checksum can be generated to use as a signature, or as a basis for a signature, for each functional coverage model, that is, for each functional coverage model portion of a coverage model database file. A unique filename portion can be generated from each of these signatures, such that for each combined coverage model, a .ucm file can be generated that can have, for example, a filename of the form icc_<code_cksum>_<func_cksum>.ucm, where <code_cksum> includes the signature for the code coverage model and <func_cksum> includes the signature for the functional coverage model. Coverage data can be stored in a similar hierarchy having, for example, unified coverage data filenames of the form icc_<code_cksum>_<func_cksum>.ucd. As an example, coverage model files can be saved in a centralized repository (e.g., a centralized directory in a computer filesystem), whereas coverage data files can be saved in a test-specific directory. As an example, top model TOP in FIG. 3 can represent an entire digital circuit design of a chip to be fabricated, whereas instance I1 can represent a central processing unit (CPU) portion of the design, instance I2 can represent an arithmetic logic unit (ALU) portion of the design, instance I3 can represent a sub-portion of the CPU portion of the design, and so on.

Coverage model database files can be given unique filenames that include signatures representative of the checksums of the contents inside each respective coverage model database file. Such a name might, for example, be of the form <C1>_<F1>.ucm, where <C1> can be a 32-bit code coverage checksum, <F1> can be a 32-bit functional coverage checksum, and ".ucm" is the standard file extension for the unified coverage model file type. A checksum-derived signature can be a function of the content of a coverage model database—the hierarchy, the properties of individual coverage items, the linkages of coverage items, and so forth. Checksums can be computed, for example, by providing different inputs to a checksum engine. For example, for code coverage portions of coverage models, a checksum engine can receive, as inputs, a scope name (e.g., package, module, instance, generate) containing code coverage metrics, as well as strings and/or numerical values that make up the code coverage metric. The checksum engine may also receipt as inputs expression strings, minterms, etc., for expression, signal name, type, etc. for one or more toggles. Similarly, in computing checksums for functional coverage portions of coverage models, a checksum engine can receive the scope name (e.g., module, package, class, generate) containing covergroups and assertions. The checksum engine may also receive as inputs data representative of specific details of covergroups and assertions, such as CoverGroup, Coverpoint, Cover bin, assertion name, and types.

As used in this description, "checksum" means a value capable of uniquely identifying a coverage model portion (for example, a code coverage model portion of a coverage model database file, or a functional coverage model portion of a coverage model database file) and which is relatively very small in comparison to the size of the coverage model portion. For example, a checksum can be only 16 bits, or only 32 bits, or only 64 bits, for a coverage model portion that may be many megabytes in size. As an example, a checksum can be generated using a cryptographic hash function. A signature is likewise a comparatively small value that uniquely identifies a coverage model portion, and in some examples can be a checksum itself or can be based on a checksum. As an example, a signature can be an integer, in decimal, hexadecimal or some other number base, that is assigned, sequentially or otherwise, to each new checksum that is generated in process 200. For example, for a first generated 32-bit checksum, a corresponding integer signature of 1 can be assigned; for a second generated 32-bit checksum, a corresponding integer signature of 2 can be assigned; and so forth. In other examples, a signature can be based on known unique-identifier techniques other than checksums.

Figure 4:
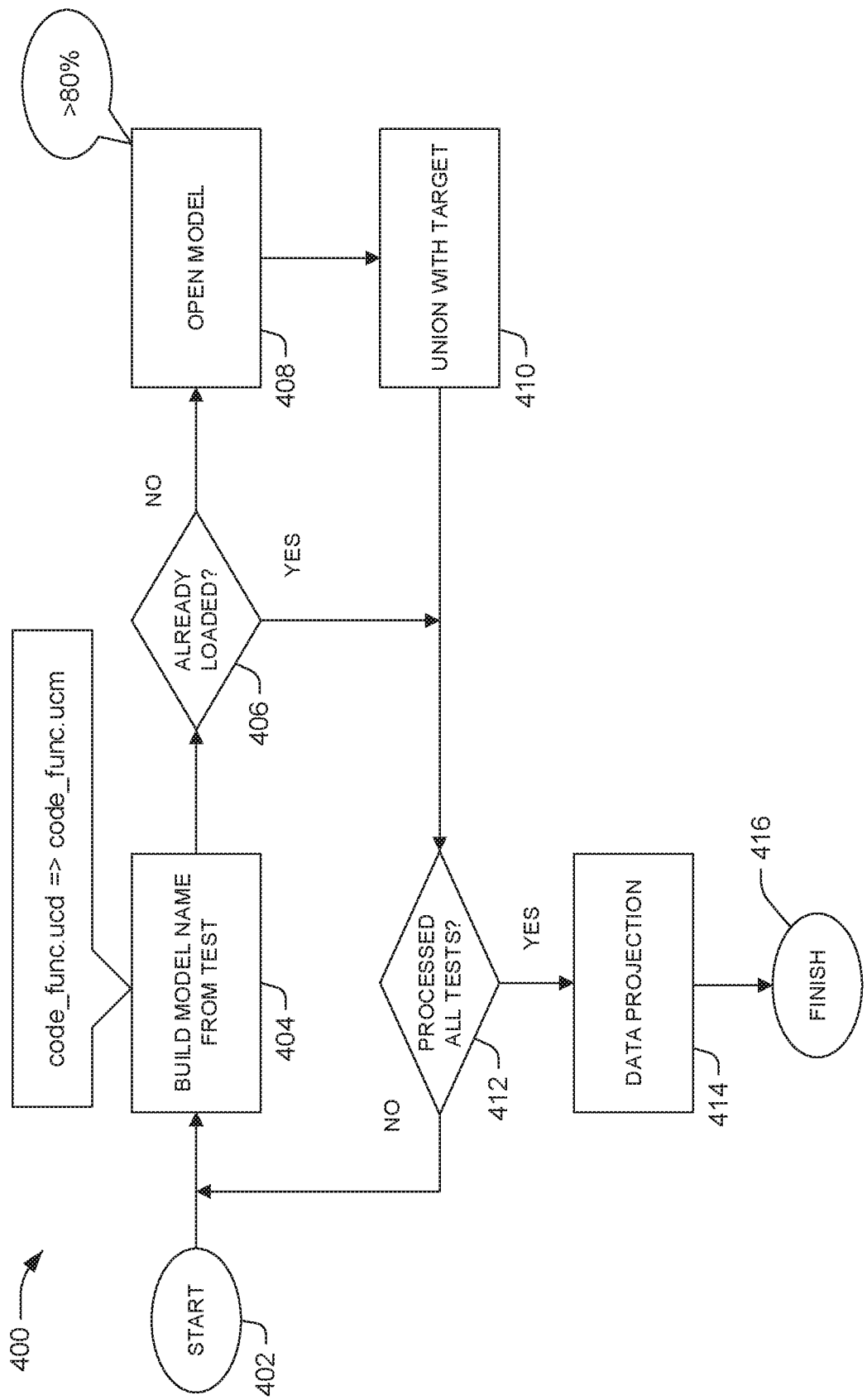
FIG. 4 is a flow diagram of an example process for union merging of coverage models.

Once a number of coverage model files have been generated, e.g., in a centralized repository, by a number of different simulation test runs, it can be useful to merge the different coverage models represented within the different coverage model files. In an example, such a repository can include coverage model files having the filenames code1_func1.ucm, code1_func2.ucm, code1_func3.ucm, code1_func4.ucm, code1_func5.ucm, and so on. The flow diagram of FIG. 4 illustrates a process 400 for union merging of coverage models. This process 400 can be invoked, for example, by a user with a command of the form merge test_1, test_2 . . . test_n-out merged_test At the start 402 of coverage model merging process 400, a model filename (e.g., of the form code_func.ucm) can be built 404 from a first specified test to be merged (e.g., from a coverage data file of the form code_func.ucd, where "code" and "func" include checksum-derived signatures, as described above). If a code coverage portion or functional coverage portion of a coverage model corresponding to the test to be merged is not already loaded 406, then the corresponding portion of the coverage model is opened 408, that is, the corresponding portion of the coverage model is retrieved from disk (e.g., hard disk or solid state drive) to a faster random access memory (e.g., DDR RAM) and the corresponding portion of the coverage model is merged 410 with the target using a union operation. The determination of whether a coverage model portion to be merged has already been loaded or not can be performed by comparing unique signature-containing filenames of the coverage model files (e.g., .ucm files) stored in the repository on disk. Following this merging, or if the model has already been loaded, if all tests have been processed 412, data projection 414 is performed and the process completes 416. If coverage model files generated by all tests have not yet been processed 412, then the process 400 continues conditionally opening and merging the coverage model generated by the next specified test, by building a model name from the next test 404, checking if that model is already loaded 406, and opening 408 and merging it with the target 410 if it is not already loaded.

This cycle can continue until all models generated by all tests have been processed 412, whereupon data from individual test cases is projected 414 to the final merged model. In practice, thousands of tests may have their corresponding coverage models merged; each test creates a unique coverage model (e.g., .ucm file). In practice, it may be that more than 80% of the time in this process 400 is consumed by opening models 408. Accordingly, time savings and efficiency can be realized by reducing this model opening 408 part of process 400 as much as possible. Where a functional coverage model changes due, for example, to a different cover group configuration, but a code coverage model remains static, due, for example, to the fact that the design under test does not change between tests, the set of coverage model files (e.g., .ucm files) loaded can have a code coverage signature that is the same but a functional coverage signature that is different for each file.

The below table illustrates an example of time savings using the selective coverage model re-use method 200 of FIG. 2 as compared to the method 100 of FIG. 1, in a case similar to that illustrated in FIG. 2 when the DUT and therefore the code coverage model remains static between simulation test runs but the testbench, and therefore the functional coverage model, changes between test runs. The sample size in this illustration is n=100 tests.

| Metrics | Model creation time | Model loading time | Single model size |
|---|---|---|---|
| Coverage All (Code + Functional) | 3616.0 s | 454.0 s | 41.2 MB |
| Only Code Coverage | 33.4 s | 4.1 s | 38.6 MB |
| Only Functional Coverage | 632.0 s | 40.7 s | 2.8 MB |

The top row of the above table, "Coverage All," gives the total time spent on coverage model creation (e.g., in successive executions of creation procedure 120 in process 100 of FIG. 1) in seconds, the total time spent on loading coverage models (e.g., in successive executions of merging procedure 132 in process 100 of FIG. 1) in seconds, and the size of a single coverage model in megabytes, for an example in which either the testbench or the DUT (or both) changes with each test run, necessitating new model creation with each test run, which also means that during the coverage model merging process, are both loaded anew for each test run. This results in a high model creation time and a high model loading time. The next row of the table, "Only Code Coverage," provides the total creation time, total loading time, and single model size values for a case in which a functional coverage model is not created or loaded over the test runs. As a result, for example, of no changes to the DUT between test simulations, there results the reuse of a single code coverage model that is newly created only once and, subsequently, loaded only once for all the test runs. Accordingly, total model creation time and loading times are greatly reduced as compared to the previous row. The bottom row of the above table, "Only Functional Coverage," provides the total creation time, total loading time, and single model size values for a case in which a code coverage model is not created and subsequently loaded for each test run, but where the testbench may be changing between each run.

As can be seen by the difference between the sum of the values of the bottom two rows in comparison to the corresponding values of the top row (665.4 seconds versus 3616.0 seconds model creation time; 44.8 seconds versus 454.0 seconds model loading time), it would be much more efficient, timewise, not to have to incur the time expense associated with creation and loading of a unified coverage model where, for example, the functional coverage model changes between test runs but the code coverage model does not, as may be the case, for example, where the testbench changes between test runs but the design under test does not. Thus, time savings can be realized where, rather than creating a new code coverage model for each generated coverage model database, the originally created code coverage model can be copied (99 times, in the example of the above table) during simulation runs, and subsequently during a merging process, rather than loading the same code coverage model one hundred times, it can be loaded only once. Thus, for each time column in the table, the sum of the values in the latter two rows, representative of the creation or load time using method 200, is much less than the value in the first row ("Coverage All"), representative of the creation or load time using method 100.

In the example of the above table, almost 4× time is saved using method 200 as opposed to method 100. The average model creation time and the average model loading time decreases with an increasing number of runs; however, in both cases the time reduction is much more significant between one run and one hundred runs than it is between one hundred runs and one thousand runs; in other words, diminishing time savings returns are realized for an increased number of test runs, and these savings are negligible for run sizes greater than n=100. Accordingly, it can be expected that the nearly 4× time savings would remain nearly constant as the number of runs increase, e.g., for runs of n=1,000, n=10,000, or greater.

Figure 5:
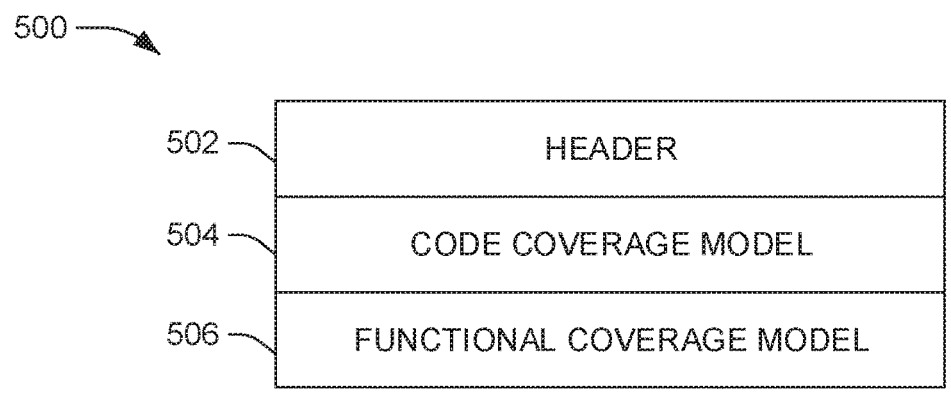
FIG. 5 is a diagram of an example integrated coverage model having a header portion, a code coverage model portion, and a functional coverage model portion.

As indicated by the "split" drawn in each of the individually illustrated databases DB1, DB2, ... DBN (which can be stored, for example, as .ucm files) in repository 228 in FIG. 2, the selective coverage model re-use methods and systems of the present description can utilize an integrated coverage model (e.g., integrated .ucm file) that includes "splitted" code coverage and functional coverage models. FIG. 5 illustrates such an integrated coverage model 500 having a header portion 502, a code coverage model portion 504, and a functional coverage model portion 506. This coverage model 500 can be generated and stored, for example, as a single .ucm file. A separate model can be created for code and functional coverages, and the individual models can be serialized into character buffers. For example, the buffers can be serialized as class members of the coverage model. The header 502 can consist of metadata, for example, a single flag (e.g., "is_splitted"), which can indicate whether the coverage model file contains splitted code coverage model and functional coverage model portions or not. Such metadata can be used to preserve backward compatibility of coverage models created with process 200 when used in other processes, such as non-selective-reuse process 100.

Figure 6:
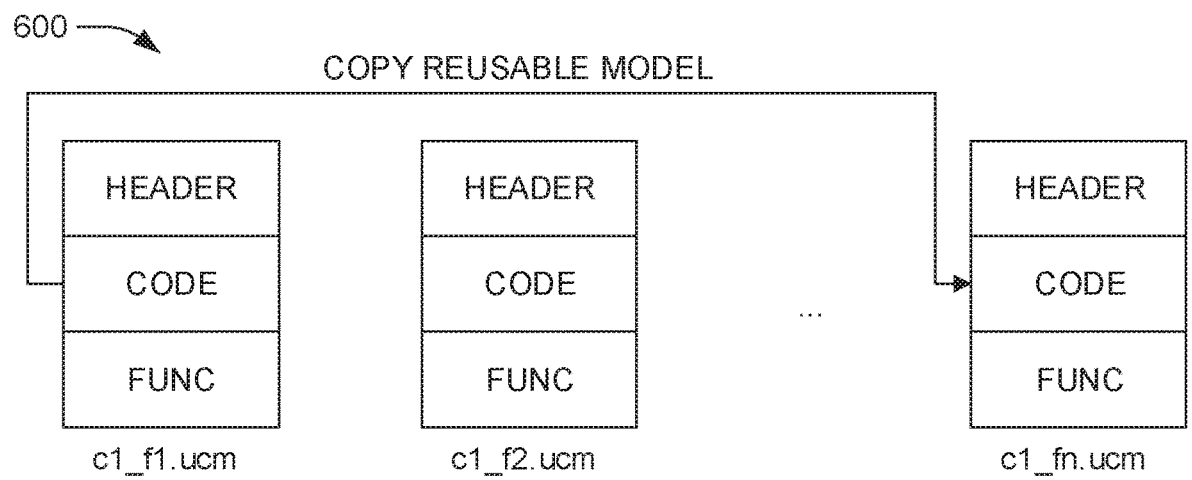
FIG. 6 is a diagram of an example code coverage model re-use by copying during model generation.

FIG. 6 illustrates how one reusable splitted coverage model portion, in the illustrated case a code coverage model, can be copied 600 from one coverage model file (c1_f1.ucm) to another (c1_fn.ucm) in the repository population process.

Figure 7:
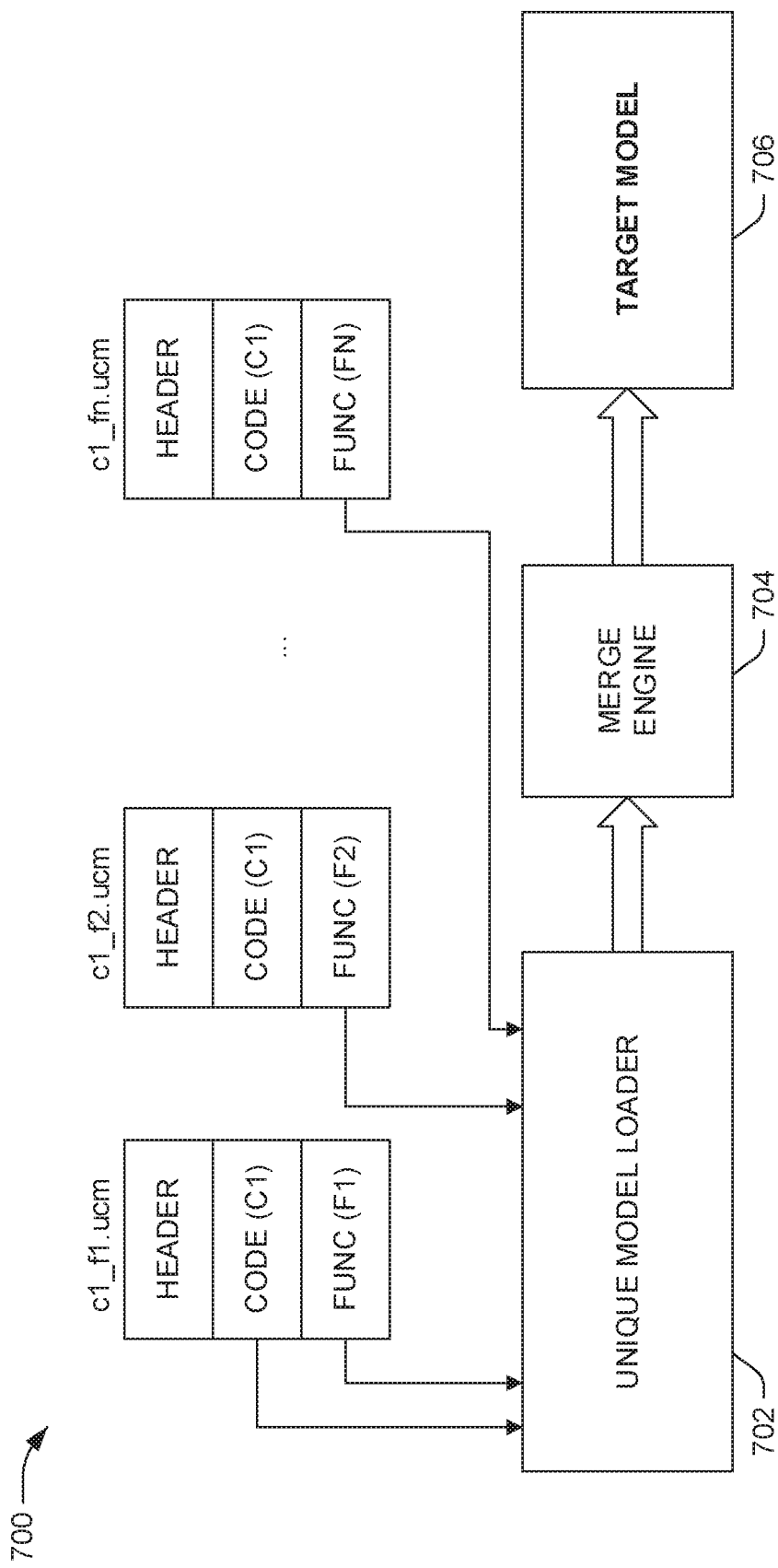
FIG. 7 is a diagram illustrating selective reading from coverage models for deserialization and merging.

FIG. 7 illustrates how loading additional duplicate code coverage model portions can be spared during a merge process 700, such as merge process 234 in FIG. 2. When the header portion of second coverage model stored as filename c1_f2.ucm indicates that that coverage model file is splitted, it can be seen from the signature (e.g., as presented in a part of the filename of the coverage model file) that the code coverage portion has already been loaded during the loading of first coverage model file c1_f1.ucm. Thus, only the functional coverage model portion of c1_f2.ucm is loaded from disk to memory. The same is true when it comes to loading nth coverage model file c1_fn.ucm, which likewise has the same code coverage model portion as the first loaded coverage model file c1_f1.ucm. Thus, the indicated portions C1, F1, F2, . . . FN are successively loaded by unique model loader 702, which can include a buffer-to-class hierarchy converter configured to deserialize the stored coverage models, and a merge is performed on the deserialized coverage models by the merge engine 704 to produce the union-merged target model 706. Because, in the illustrated example, the code coverage is the same between all coverage models, code coverage model portion C1 is only loaded once, resulting in time savings.

A coverage model can be represented, for example, as a C++-class object hierarchy. As mentioned above, a coverage model can be serialized into binary format for storage to disk, and can subsequently be deserialized for use upon loading from disk. Serialization, in essence, "flattens" what can be a quite complicated graph structure, with various data potentially being stored at different nodes in the graph, into a one-dimensional stream of bits (the resultant binary file). Deserialization restores a class object hierarchy from a serialized binary format. Boost is a set of open-source C++ libraries that provide support for tasks and structures. The Boost serializer library can be used for serializing and deserializing a coverage model class object hierarchy in memory. Boost serialization supports various user-configurable filters. For example, a first filter can convert a class object hierarchy to binary, and a second filter can be used to store the binary to disk, where, for example, it can reside as a named file in a database repository, corresponding, for example, to repository 228 in FIG. 2.

Most of the time involved in the Boost serialization process is consumed not by the writing of a serialized binary to disk, but in the serialization itself of the class object hierarchy to binary format. For example, this serialization can take about 90% of the time of the process. This serialization can be bypassed when a model portion is copied, as represented by 218 in FIG. 2 or 600 in FIG. 6. Similarly, the counterpart deserialization process (which can, for example, be performed by unique model loader 702 in FIG. 7) is not needed to be done for model portions that are not loaded as part of the merging process, as represented by 234 in FIG. 2 or 406 in FIG. 4. The elimination of this serialization and deserialization results in time savings realized by selective coverage model re-use process 200.

The selective coverage model re-use of the methods and systems of the present application leverage the understanding that code coverage models are, in practical use, highly static, as compared to functional coverage models, which are relatively dynamic, to provide a variety of advantages, including time savings during writing repository population (database generation) from the in-memory model creation of a re-used model, and class hierarchy serialization of the re-used model, and time savings during loading and merging from the class hierarchy deserialization of the re-used model. This has been shown to produce about a 4× speed-up in model creation as well as an about 4× speed-up in model union merging. In addition to realizing such speed improvements, the methods and systems presently described retain the unified coverage model structure and provide coverage model files that are backwards-compatible with preexisting merging and analysis processes.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method for selective re-use of serialized coverage models in electronic design automation, the method comprising:
   using a computer processor, populating a database repository with a plurality of coverage model databases with each database including a code coverage model associated with a design under test and a functional coverage model associated with a testbench, the populating comprising:
      computing respective signatures for each of a first code coverage model and a second code coverage model;
      based on determining from the first code coverage model signature that the first code coverage model is not already in the repository, storing the first code coverage model in the repository; and
      based on determining from the second code coverage model signature that the second code coverage model is already in the repository, copying the existing second code coverage model within the repository; and
   selectively reading from the repository only unique code coverage models and only unique functional coverage models from the plurality of databases; and
   merging the selectively read code coverage models and functional coverage models.

2. The method of claim 1, wherein the first code coverage model stored in the repository is based on test result data generated from one or more simulation runs performed by applying simulated signals from the testbench to the design under test.

3. The method of claim 2, further comprising modifying the testbench, creating a new testbench, and/or modifying the design under test based on determining that coverage is not closed following the analyzing the merged code coverage models and functional coverage models.

4. The method of claim 3, further comprising repeating the simulation runs with the modified testbench, the new testbench, and/or the modified design under test, and further populating the database repository with additional databases, the further populating comprising, for each additional database:
   creating a new code coverage model for storing in the repository based on determining that a code coverage model based on test result data generated from the repeated simulation runs is not already in the repository, or copying the code coverage model based on test result data generated from the repeated simulation runs in the repository based on determining that the code coverage model based on test result data generated from the repeated simulation runs is already in the repository; and creating a new functional coverage model for storing in the repository based on determining that a functional coverage model based on test result data generated from the repeated simulation runs is not already in the repository, or copying the functional coverage model based on test result data generated from the repeated simulation runs in the repository based on determining that the functional coverage model based on test result data generated from the repeated simulation runs is already in the repository.

5. The method of claim 2, wherein the simulation runs are performed on a load-sharing facility (LSF).

6. The method of claim 1, wherein the selectively reading only unique code coverage models and only unique functional coverage models from the plurality of databases is based on comparing filenames of coverage model files, wherein each coverage model file is generated by a different test simulation run.

7. The method of claim 1, wherein the determining that the code coverage model is already in the repository or the determining that the functional coverage model is already in the repository is based on comparing checksum values generated from coverage model files, wherein each coverage model file is generated by a different test simulation run.

8. The method of claim 1, further comprising analyzing the merged code coverage models and functional coverage models to determine an amount of test coverage achieved.

9. A system for selective re-use of serialized coverage models in electronic design automation, the system comprising one or more computer processors coupled to a non-transitory memory storing instructions configured to, when executed by the one or more computer processors:

populate a database repository with a plurality of coverage model databases with each database including a code coverage model associated with a design under test and a functional coverage model associated with a testbench, the population comprising:

computing respective signatures for each of a first code coverage model and a second code coverage model;

based on determining from the first code coverage model signature that the first code coverage model is not already in the repository, storing the first code coverage model in the repository; and based on determining from the second code coverage model signature that the second code coverage model is already in the repository, copying the existing second code coverage model within the repository; and selectively read from the repository only unique code coverage models and only unique functional coverage models from the plurality of databases; and merge the selectively read code coverage models and functional coverage models.

10. The system of claim 9, wherein the first code coverage model stored in the repository is based on test result data generated from one or more simulation runs performed by applying simulated signals from the testbench to the design under test.

11. The system of claim 10, wherein the instructions are further configured to modify the testbench, create a new testbench, and/or modify the design under test based on user input and based on determining that coverage is not closed following the analysis of the merged code coverage models and functional coverage models.

12. The system of claim 11, wherein the instructions are further configured to, when executed on the one or more computer processors, repeat the simulation runs with the modified testbench, the new testbench, and/or the modified design under test, and further populate the database repository with additional databases, the further population comprising, for each additional database:

creating a new code coverage model for storing in the repository based on determining that a code coverage model based on test result data generated from the repeated simulation runs is not already in the repository, or copying the code coverage model based on test result data generated from the repeated simulation runs in the repository based on determining that the code coverage model based on test result data generated from the repeated simulation runs is already in the repository; and creating a new functional coverage model for storing in the repository based on determining that a functional coverage model based on test result data generated from the repeated simulation runs is not already in the repository, or copying the functional coverage model based on test result data generated from the repeated simulation runs in the repository based on determining that the functional coverage model based on test result data generated from the repeated simulation runs is already in the repository.

13. The system of claim 10, configured to perform the simulation runs on a load-sharing facility (LSF).

14. The system of claim 9, wherein the selective reading of only unique code coverage models and of only unique functional coverage models from the plurality of databases is based on a comparison of filenames of coverage model files, each coverage model file having been generated by a different test simulation run.

15. The system of claim 9, wherein the determination that the code coverage model is already in the repository or the determination that the functional coverage model is already in the repository is based on a comparison of checksum values generated from coverage model files, each coverage model file having been generated by a different test simulation run.

16. The system of claim 9, wherein the instructions are further configured to analyze the merged code coverage models and functional coverage models to determine an amount of test coverage achieved.

17. A non-transitory computer-readable medium storing instructions that, when executed by a processor, cause the processor to:

populate a database repository with a plurality of coverage model databases with each database including a code coverage model associated with a design under test and a functional coverage model associated with a testbench, the population comprising:

computing respective signatures for each of a first code coverage model and a second code coverage model;

based on determining from the first code coverage model signature that the first code coverage model is not already in the repository, storing the first code coverage model in the repository; and based on determining from the second code coverage model signature that the second code coverage model is already in the repository, copying the existing second code coverage model within the repository; and selectively read from the repository only unique code coverage models and only unique functional coverage models from the plurality of databases; and merge the selectively read code coverage models and functional coverage models.

18. The method of claim 1, wherein the first code coverage model stored in the repository is based on test result data generated from one or more simulation runs performed by applying simulated signals from the testbench to the design under test.

19. The computer-readable medium of claim 17, wherein the instructions are further configured to, when executed on the one or more computer processors, modify the testbench, create a new testbench, and/or modify the design under test based on user input and based on determining that coverage is not closed following the analysis of the merged code coverage models and functional coverage models.

20. The system of claim 19, wherein the instructions are further configured to, when executed on the one or more computer processors, repeat the simulation runs with the modified testbench, the new testbench, and/or the modified design under test, and further populate the database repository with additional databases, the further population comprising, for each additional database:

creating a new code coverage model for storing in the repository based on determining that a code coverage model based on test result data generated from the repeated simulation runs is not already in the repository, or copying the code coverage model based on test result data generated from the repeated simulation runs in the repository based on determining that the code coverage model based on test result data generated from the repeated simulation runs is already in the repository; and creating a new functional coverage model for storing in the repository based on determining that a functional coverage model based on test result data generated from the repeated simulation runs is not already in the repository, or copying the functional coverage model based on test result data generated from the repeated simulation runs in the repository based on determining that the functional coverage model based on test result data generated from the repeated simulation runs is already in the repository.

\* \* \* \* \*